June 27, 1967  F. H. ANCKER  3,328,503
PROCESS FOR THE MANUFACTURE OF THERMOPLASTIC FILMS
Filed March 24, 1965

INVENTOR.
FRED H. ANCKER
BY
ATTORNEY 3,328,503
PROCESS FOR THE MANUFACTURE OF
THERMOPLASTIC FILMS
Fred H. Ancker, Warren Township, Bound Brook, N.J.,
assignor to Union Carbide Corporation, a corporation
of New York
Filed Mar. 24, 1965, Ser. No. 442,334
12 Claims. (Cl. 264—175)

This application is a continuation-in-part of application Ser. No. 179,859, filed Mar. 15, 1962, now abandoned.

The present invention relates in general to a process for making film and sheet from crystalline thermoplastic polymers. More particularly, it relates to a process wherein crystalline, oriented films and sheets having improved clarity, surface gloss, tensile properties and stress crack resistance are provided by mechanically induced crystallization.

In recent years, considerable advances have been made in understanding the causes and effects of polymer crystallinity and morphology. For example, reference is made herein to the general review in R. H. Doremus et al., "Growth and Perfection of Crystals," Chap. 6, John Wiley and Sons, Inc., New York (1958).

All crystalline polymers which are capable of melting without decomposition are transparent in their molten, amorphous state. However, after cooling and crystallization, they become opaque or hazy. The origin of this opacity or haze is believed to be light scattering from boundaries between domains of different refractive index, created by the crystallization. Polymer crystallites are normally small in comparison with the wavelength of light and therefore they do not in themselves contribute materially to the scattering. However, polymer crystallites have a so-called spherulitic growth habit, i.e., they form polycrystalline aggregates when grown from the melt. Within these aggregates, as well as at boundaries between them, interfaces are formed between amorphous and crystalline domains of different refractive index. Moreover, since the refractive index varies with the crystallographic direction within a crystallite, orientation differences between adjacent crystalline regions also lead to scattering. Furthermore, surface irregularities caused by the crystalline aggregates also contribute markedly to the haze or opacity after crystallization.

A high degree of crystallinity is nevertheless desirable in a polymer because it generally leads to better mechanical and thermal properties, improved resistance to solvents and improved electrical properties. However, high crystallinities developed by slow cooling of a melt often lead to brittleness and poor stress crack resistance, presumably because of crystallization fractionation, whereby lower melting polymer molecules accumulate in the interstices and boundaries of the spherulites. Poor optical properties together with brittleness and low resistance to stress cracking are thus usually the most important problems associated with otherwise desirable high levels of crystallinity.

When a moving molten film web is cooled below the melting point of the polymer, onset of crystallization manifests itself by the formation of a so-called "frost-line," behind which the web is clear because it is still molten and amorphous; and in front of which the now at least partially crystallized web is more or less opaque, the degree of opacity depending on the rate of cooling. If the molten web is allowed to cool slowly in air, the frost-line is very pronounced, but even in chill roll casting, where the film is quenched on a cold metal roll, the frost-line is still discernible.

In quenching processes such as chill roll casting, crystallization is arrested by the increase in viscosity of the amorphous phase. Thus, large well-developed crystalline aggregates do not have time to form and it is therefore often, although not always, possible to make fairly clear stress-crack resistant films by such methods. However, these improvements are achieved at a sacrifice in crystallinity.

Improvements in optical properties, stress crack resistance, etc. are often possible without a decrease in crystallinity by orientation techniques. However, orientation in tension such as is practiced by various stretching techniques imposes strict demands on the properties of a particular polymer. Thus, inherent brittleness, a natural coarse spherulitic texture, the presence of gel particles in the resin, etc. preclude in many instances orientation of film or sheeting made from a particular polymer.

In contrast, many resins which are too fragile for stretching may still be oriented in compression. This can be done by a cold rolling technique similar to that used in the metals industry, whereby an opaque, crystalline sheet is compressed, often several fold, between a pair of counter-rotating rolls. If this is done at temperatures well below the crystalline melting point of the resin, clear, highly oriented, crystalline films can be made. Unfortunately, since this is a cold forming process, enormous nip pressures must be used and such massive, special equipment is required that this process as yet has not been commercially applied in the plastics industry.

Accordingly, it is an object of the present invention to provide a method for preparing crystalline, oriented film and sheeting of improved clarity, surface gloss, tensile properties and stress crack resistance from normally opaque, crystalline polymers.

It is another object to provide a method which, by orienting in compression rather than tension, is very insensitive to the tensile properties of the base polymer as well as to any presence of resin gel particles.

It is still another object to provide a method which can be readily accomplished on conventional plastic calenders and mills without the need for special massive and expensive rolling mills.

The present invention achieves these and other objects by providing a process for preparing oriented, crystalline thermoplastic film and sheeting having improved optical and physical properties which comprises passing a molten amorphous thermoplastic web into the nip formed by a pair of counter-rotating rolls without the formation of a bank at the ingress side of the nip, maintaining the roll temperatures, roll speeds and the roll separating force so that crystallization occurs solely within said roll nip and the web emerges from the egress side of said roll nip as a crystallized, clear, oriented film.

Thus, in the process of the present invention, which will hereinafter be referred to as "melt rolling," no frost lines are observed because although the web may be supercooled before entering the roll nip, it is still in an amorphous state. Also, the phase transition from amorphous to crystalline occurs instantaneously in the roll nip itself, induced by the compressive and shearing forces in the nip, and subsequent cooling causes no further increase in crystallinity or decrease in optical properties.

The absence of frostlines on either side of the roll nip is considered critical in this invention. If, for example, a frost line is allowed to form before the preformed web enters the roll nip, then the web is already partially crystallized and a clear oriented film cannot be obtained except by use of extreme separating forces as in cold rolling. If, on the other hand, the conditions in the roll nip are such that only partial or no crystallization takes place, then a frost line will form subsequent to the emergence of the film from the egress side of the roll nip and an opaque or hazy film will result.

The absence of a so-called "bank" at the entrance to the roll nip is also a critical requirement in this invention. A "bank" as used herein is intended to denote a kneading accumulation of molten resin on the ingress side of the roll nip, the origin of which is explained more fully below. It has been found that such an accumulation must be absent, otherwise serious defects are formed which render the film useless.

When these critical processing requirements are complied with however, it has been surprisingly found that clear, highly oriented films can be obtained which are quite similar to those which can be obtained by cold rolling. These films have been made, nevertheless, with roll separating forces at least 5–10 fold smaller than those which are required in order to obtain similar effects by cold rolling. In fact, the separating forces in the present invention are usually of the same order of magnitude as those normally required in conventional calendering of the same resin compositions or even less. Furthermore, crystallinity determinations by X-ray diffraction as well as density measurements have shown that crystallinities are easily obtained which are as high as those found in a slowly cooled film of the same composition.

Although not wishing to be bound by any theory or mechanism, it is believed that the reasons why it is possible to attain such high degrees of crystallization in the present invention even at high roll speeds is attributable to the flow conditions in the roll nip. In the present invention there is a combination of high hydrostatic pressure and high shear forces (velocity gradients) established in the rolling. The crystalline density in polymers is usually higher than the amorphous density, and it follows therefore from Le Chatelier's principle that crystallization is favored by increases in the hydrostatic pressure as it has indeed been experimentally found for high polymers. (S. Matsuoka and B. Maxwell, J. Polymer Sci., 32, 131 (1958).) Moreover, it is well known that shear flow induces nucleation and thereby crystallization in polymer melts because of chain alignment (A. Keller, J. Polymer Sci., 15, 31 (1955)). Such effects are believed to be responsible for the fact that crystallization can take place during the extremely short residence times in the roll nip.

Other aspects of the invention are best demonstrated by comparison and by contrast to other roll forming processes, namely calendering (R. E. Gaskell, J. Appl. Mech., 17, 334 (1950) and P. R. Pasley, ibid. 24, 602 (1957)), embossing or surfacing (Canadian Patent 586,366) and cold rolling (E. Orowan, Proc. Inst. Mech. Engrs, 150, 140 (1943)). For a detailed discussion of these processes, reference is made herein to the publications listed above.

In the calendering process, a resin is introduced into a roll nip either in the form of a molten mass or as a molten web appreciably thicker than the clearance between the rolls. Due to the squeezing action of the rolls, a hydrostatic pressure is developed in the melt on the ingress side of the roll nip which forces the melt backwards in the center, thereby creating a vortex flow. This, then, is the origin of the kneading accumulation of molten resin commonly referred to as the calendering bank. It is the function of the bank to homogenize the melt and to spread it out in the axial direction into the desired width of the emerging molten film web.

In continuous embossing and surfacing processes, such as they are normally employed for embossing of engraved patterns on calendered sheet or in surfacing of extruded sheeting, a molten film web is also introduced into the nip between a pair of rolls, one of which usually is engraved or highly polished. In these processes it is essential that vortex flow does not occur at the entrance side of the roll nip, i.e., that no rotating bank is formed, otherwise the web surface is destroyed. This can only be achieved if the nip pressure is low enough so that no significant reduction in the thickness of the molten web occurs during passage through the roll nip. The nip pressure is therefore usually supplied by a yieldable system, e.g., springs, pneumatic or hydraulic cylinders, etc. It is often also necessary to use a resilient (rubber) back-up roll in order to attain adequate contact between the molten web and the embossing roll in spite of the low nip pressures. Furthermore, while some cooling often is applied to embossing and surfacing rolls in order to protect the freshly embossed web surface, the web is still in a molten, amorphous state when leaving the embossing roll and in case of crystalline resins, a distinct frost line forms therefore in the web during the subsequent cooling. In fact, embossing is best done at as high a web temperature as possible since this gives the best surface retention quality of the final product.

It is a hydrodynamic impossibility to apply high nip pressures while passing a viscous liquid through a roll nip, without at the same time, developing back flow and therefore forming a bank. It was therefore very surprising to find that during the critical conditions of melt rolling, nip pressures as high as those encountered in conventional calendering can be applied without such bank formation. Evidently, crystallization occurs rapidly enough so that the web over-all behaves more like a plastic solid while in the roll nip.

In some respects therefore, melt rolling has certain similarities to cold rolling. However, even aside from the significantly lower nip pressures required in melt rolling, there are other important processing differences. In cold rolling, a crystalline polymeric sheet is introduced into the roll nip in a plane perpendicular to that formed by the axes of the roll pair and containing the mid-line of the nip. The nip opening is usually considerably smaller than the entrance thickness of the sheet and the linear speed of the sheet on the ingress side of the roll nip is therefore much lower than the peripheral roll speed. The film leaves the rolls in the same plane as the entrance plane and at the same or at a slightly higher speed than the peripheral roll speed, depending on the degree of friction between the sheet and the rolls. It is essential for film handling in the cold rolling process and also for the properties of the resulting film that the entering sheet as well as the leaving film both are in a solid, crystallized state. The temperature of the rolls as well as of the entering sheet must be adjusted accordingly.

In the drawing, there is diagrammatically illustrated apparatus suitable for use in the production of film according to this invention.

Figure 1:
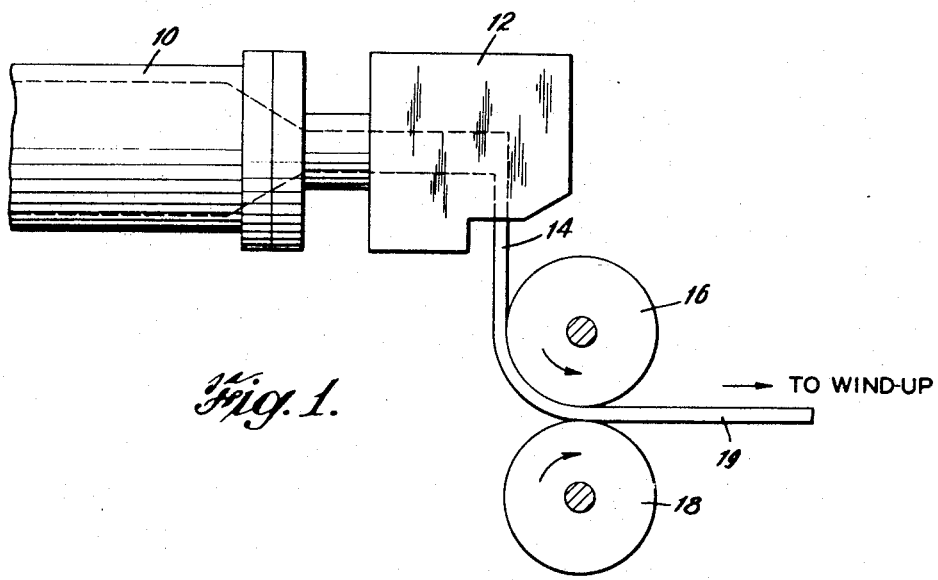
FIG. 1 shows an extruder employed to form a molten web which is subsequently melt rolled in the nip of a single pair of counter rotating rolls.

With respect to FIG. 1, a crystalline polymer is heated and sheared into a molten amorphous state in extruder barrel 10 from whence it is passed to a film or sheet forming T-slot die 12. As the newly formed molten web 14 issues from die 12 it is brought into contact with roll 16 which is rotating in a direction such that the web follows the surface of roll 16 into the opening between roll 16 and roll 18. The temperature and speed of roll 16 as well as the extent to which the molten web 14 is wrapped around roll 16 can be adjusted so that the web is near or below its melting point, yet is optically clear without any frost line formation as it passes into the opening between roll 16 and roll 18. Roll 18, which is also preferably maintained at a temperature close to or below the melting point of the resin, is now brought in contact with web 14 on roll 16 increasing the nip pressure until a clear, glossy, crystallized film 19 emerges from the egress side of the roll nip. If the temperatures of the entering web 14 as well as rolls 16 and 18 are sufficiently low, no difficulty is encountered in avoiding bank formation at the entrance side of the roll nip. At film thicknesses below about 5 mils, optimum results are usually obtained with even peripheral speeds of rolls 16 and 18; however, with thick films, i.e., greater than about 5 mils, a differential roll speed is sometimes beneficial. It is considered preferable in such instances that the counter-rotating rolls be driven at speeds in the ratio of from 1.0 to not greater than 2.0. The web 19 is then passed either to windup or to further fabrication procedures of conventional type.

Figure 2:
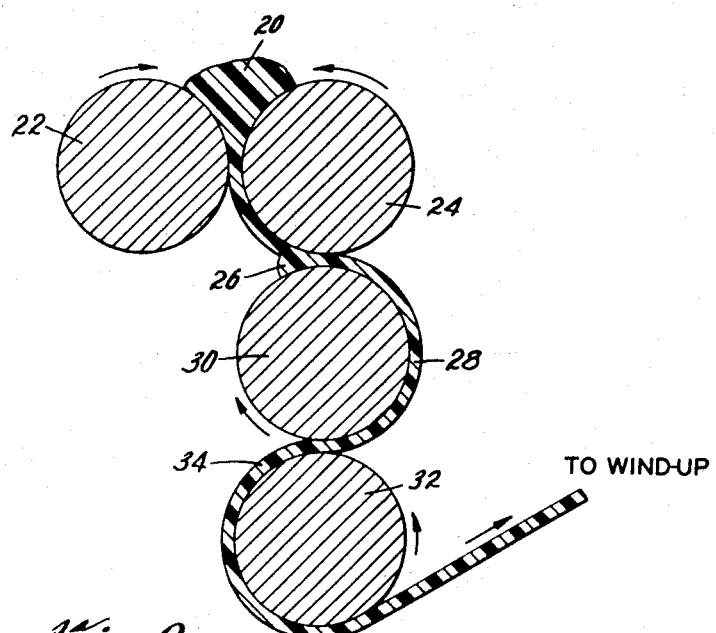
FIG. 2 shows a conventional four roll inverted L type calender apparatus in which the first three rolls from the top are utilized to form the molten polymer mass into a preformed web which is subsequently melt rolled in accordance with this invention using the last two rolls of the series.

With respect to FIG. 2, a mass of polymer 20 is fed to the nip between rolls 22 and 24, and upon passage therethrough is formed into a molten web. The web follows roll 24 from the first nip to the nip formed between rolls 24 and 30 wherein an improved molten web is produced. In accordance with conventional calendering practice, a bank 26 is formed at this nip to improve the uniformity of the melt.

Upon emergence from the second nip of the series the molten web 28 is supported and transported to the nip between roll 30 and roll 32 in which the phase transition from the molten, amorphous state to the solid crystalline state occurs. No bank is permitted to form at this last nip and the temperature of finishing rolls 30 and 32 are so adjusted that the web 28 is still optically clear and free of any frost line at the entrance to the nip, yet sufficiently cool to undergo the necessary phase transition in passing through the nip to emerge as crystallized web 34. The finished web is thereafter passed to windup or to further fabrication procedures.

It is immaterial to the practice of this process by what method the web to be treated is formed. Thus the preformed web can be initially formed by solution casting, by melt casting, by calendering, or by extrusion so long as the web has been molten and is in the amorphous state. Also, where more than the two essential counter-rotating rolls are employed, the temperatures of the other rolls are not critical and can be adjusted according to the prior art to achieve the best possible quality of molten web for processing in accordance with this invention.

The term "crystalline melting point" as used herein refers to the minimum temperature at which crystallinity is no longer discernible by optical methods (e.g., crossed nicol prisms) or other means, when the polymer is heated. As is well known, many polymers are subject to supercooling, and the temperature at which crystallization occurs upon cooling from the melt, sometimes referred to as the "freezing point," is not a constant for a given polymer sample but may decrease dramatically with the rate of cooling. Actually, at the very rapid cooling rates common in film processes, it is not unusual that the freezing point, i.e., the temperature of incipient crystallization, may be 25° C. or more below the melting point. Therefore, the phrase "an amorphous web" as used herein is intended to define a physical state of matter rather than the temperature of the web in relation to the crystalline melting point of the polymeric composition. Thus, for the purpose of this invention, a continuous, moving, molten film web which is undergoing cooling is considered to be in the amorphous state up until the frost line, no matter what the actual web temperature may be. Accordingly, the optimum roll temperatures in melt rolling cannot be generally defined without reference to a specific polymer, web entrance temperature, film thickness, roll speed, etc. However, with most polymers and commercial processing speeds, the mean temperature of the two rolls is usually 5–50° C. below the crystalline melting point of the polymer.

As will be obvious to those skilled in the art, a precise expression of optimum nip pressures in melt rolling can be made only with reference to the diameters of the rolls the roll clearance at the nip, the thickness of the web entering the nip, the roll speeds, and the rheological properties of the particular polymer at the crystallization temperature. This being the case, a precise expression of preferred pressures which would be applicable in general to the present process is neither feasible nor practical. As an example of the optimum nip pressure, however, it has been found that for the poly(ethylene oxide) polymer of Example 1, infra, using equal speed 18-inch steel rolls to produce 2 mil film at a thickness reduction not greater than about 20 percent, a pressure value of about 2,500 pounds per linear inch in the direction of the roll axis was found highly effective. All other factors being constant, a roll diameter reduction from 18 inches to about 5 inches would require a pressure of the order of 1,000 pounds per linear inch to achieve the same results. Similarly, an increase of roll diameter to about 26 inches necessitates an increase in pressure to the order of about 4,000 pounds per linear inch. Thus, there must be a positive pressure exerted on the web as it traverses the nip and undergoes a transition from the amorphous state to the crystalline state. Pressures need not be exceeded beyond those which will result in a reduction of film thickness of more than 5 percent, however, a thickness reduction of 10–25 percent is preferred.

For comparison, in order to achieve similar results by cold rolling using the same resin composition, a five-fold thickness reduction is required and the corresponding nip pressures range from 7,000 lbs. per linear inch (5" diameter roll) to about 15,000 lbs./in. (18" diameter roll) and about 25,000 lbs./in. (26" diameter roll). Thus, while the nip pressures encountered in melt rolling are within the load capabilities of usual plastic calenders and mills, those of cold rolling are so high as to require extremely massive and expensive, special rolling mills.

The present process provides excellent results with the general class of crystalline fiber and film forming synthetic organic polymers which normally contain at least about a 5 percent crystalline content as indicated by X-ray or density measurements, and preferably at least about 20 percent, at ambient room temperatures. Such polymers, which are either normally available in crystalline form or can be prepared as crystalline polymers by the proper selection of catalysts and polymerization conditions, are well known in the art and include polyolefins such as high and low density polyethylene, polypropylene, polybutene-1, poly(4-methyl pentene), and the like and copolymers thereof; vinyl polymers such as poly(vinyl chloride), poly(vinyl fluoride), poly(vinyl acetate), and the like and copolymers thereof; poly(vinylidene fluoride), poly(trifluorochloroethylene, poly(tetrafluoroethylene), poly(trifluoropropylene), and the like and copolymers thereof; acrylic polymers such as polyacrylonitrile, poly(acrylic acid), polyacrylamide, polymethylmethacrylate, and the like, and copolymers thereof; polyesters such as poly(ethylene terephthalate), poly(ethylene isophthalate); polyethers such as poly(methylene oxide), poly(ethylene oxide), poly(propylene oxide), poly(butylene oxide), poly(butadiene monoxide), poly(styrene oxide), and the like and copolymers and terpolymers thereof; polyamides such as poly(hexamethylene adipamide) poly(hexamethylene sebacamide) and the like; and polyurethanes such as Perlon U (the fiber forming condensation polymer of hexamethylene diisocyanate and tetramethylene glycol).

Preferred polymers, i.e., those which exhibit the most exceptional improvement when fabricated according to the present process are highly crystalline polyethylene, polypropylene, poly(4-methyl pentene), poly(methylene oxide), poly(trioxane) and the homopolymers and copolymers of ethylene oxide, propylene oxide, butylene oxide and styrene oxide having average molecular weight values of from about five thousand to about ten million. Particularly preferred polymers are the fiber forming, water-soluble poly(ethylene oxide) homopolymers and the fiber forming water soluble copolymers of ethylene oxide with propylene oxide, styrene oxide, or butylene oxide, e.g., poly(ethylene oxide-styrene oxide) copolymers containing from about 0.1 to about 1.5 weight percent interpolymerized styrene oxide, poly(ethylene oxide-butylene oxide) copolymers containing from about 0 to about 15 weight percent interpolymerized butylene oxide, poly(ethylene oxide-propylene oxide) copolymers containing from about 0.1 to about 15 weight percent interpolymerized propylene oxide, and poly(ethylene oxide-styrene oxide-butylene oxide) terpolymers containing from about 0.1 to about 10 weight percent styrene oxide and from about 0.1 to about 10 weight percent butylene oxide interpolymerized.

Poly(ethylene oxide) and some of its copolymers have been selected as illustrative resin examples because of their well-known deficiencies in stress crack resistance, orientability by stretching, etc. While the following examples are intended to more fully illustrate the present invention, they are in no way intended to be limitative thereof.

Unless otherwise indicated, a calender apparatus substantially as shown in FIG. 2 of the drawings was employed. For purposes of identifying the individual rolls of the calender series, the rolls numbered 22, 24, 30 and 32 in FIG. 2 are designated in the following examples as rolls 1, 2, 3, and 4 respectively or as the first, second, third and fourth rolls respectively. The diameter of the calender rolls was 18" in Examples 1, 3 and 4, and the diameter was 8" in Examples 2, 5, 6, 7 and 8.

EXAMPLE 1

Using a conventional 4 roll inverted L calender (rolls 18" in diameter and 48" in length) such as shown in FIG. 2 of the drawings, film having a 2 mil thickness was formed from high molecular weight poly(ethylene oxide), reduced viscosity of about 5.5 (0.1 gm. polymer/100 ml. H₂O solution at 25° C.), having improved tensile strength, optical properties, and stress endurance. A composition consisting of 100 parts by weight normally solid poly(ethylene oxide) having a crystalline melting point of 63–65° C., 10 parts by weight of non-ionic detergent (Tergitol NP 40, an ethylene oxide adduct of nonylphenol) and 0.06 part by weight of an antioxidant (phenothiazine) was fluxed and sheeted on a two-roll mill to obtain a uniform blend. The resulting polymer composition was thereafter fed to the nip formed by the first and second rolls of the calender, the roll temperatures being 129° C. and 127° C. respectively. Upon passage through the first nip the web was fed to the nip between the second and third rolls of the calender. The third roll temperature was maintained at 56° C. A bank of molten polymer composition was maintained at the ingress side of the second nip. The molten web followed the third roll into the third nip formed between the third and fourth rolls without any bank being formed. The four (i.e. last) roll was maintained at 48° C. As the molten web approached the last nip of the calender in contact with the third calender roll, the web was cooled without formation of a frost line on this roll and while passing through the last nip under a roll pressure of about 2,500 pounds per linear inch underwent a phase transition from the amorphous to the crystalline state. Linear rate of emergence of the solid web from the last nip was 51 feet per minute. Properties of the film so produced are set forth in Table I below and are compared with properties of film formed from the same material using conventional calendering techniques in which the film emerging from the last nip was still in the molten, amorphous state.

TABLE I

| | Example 1, Melt Rolled | Conventionally Calendered |
|---|---|---|
| Tensile Strength, p.s.i.: | | |
| Machine Direction | 10,379 | 1,800 |
| Transverse Direction | 2,466 | 1,500 |
| Graves Tear, lbs./in.: | | |
| Machine Direction | 509 | 450 |
| Transverse Direction | 1,208 | 500 |
| Specular Light Trans., percent | 28 | 0.5 |
| Haze, percent | 12.7 | 80 |
| Surface Appearance | (¹) | (²) |
| Stress Crack Resistance, hours: Machine Direction | >500 | 10–20 |

¹ Excellent.
² Fair.

EXAMPLE 2

Using the same poly(ethylene oxide) composition of Example 1 two film samples were prepared as follows: (A) The first, second, third and fourth calender rolls were maintained at temperatures of 143° C., 116° C., 57° C. and 30° C. respectively. The fluxed resin composition was fed to the nip between rolls 1 and 2. After passage through the nip the initially formed film followed roll 2 to the nip between rolls 2 and 3. A bank formation was maintained at the ingress side of this nip, and the nip pressure was about 1,200 pounds per linear inch of film width. After passage through the nip, the fully formed web followed roll 3 to the melt rolling nip between rolls 3 and 4 where no bank was permitted to form. Nip pressure was maintained at 800 pounds per linear inch of film width. Transition of the web from amorphous to crystalline occurred in the last nip with a linear emergence rate of 16 feet per minute. Properties of the film compared with the film produced by part B below are provided in Table II infra.

(B) The process carried out in part (A) was repeated using exactly the same operating conditions except that the nip between the third and fourth rolls was opened, i.e., the fully formed web following roll 3 was transferred to roll 4 with the clearance between the two rolls being substantially wider than the film thickness, that is, the crystallization occurred in the absence of the pressure of a nip and with formation of a frostline, on roll 4. The film properties are shown in Table II.

TABLE II

| | 2(A) Melt Rolled | 2(B) Calendered |
|---|---|---|
| Tensile Strength, p.s.i.: | | |
| Machine Direction | 6,780 | 2,060 |
| Transverse Direction | 1,530 | 1,670 |
| Light Transmission, percent | 38 | 10 |
| Haze, percent | 9.5 | 77 |
| Film thickness, mils | 1.75 | 1.94 |

As is readily observable from the data of Table II, even fairly slight pressures in the nip where crystallization of the molten web occurs can produce a remarkable improvement in the film as compared with film which, although otherwise treated in an identical manner, is permitted to crystallize other than while being subjected to nip pressures.

EXAMPLE 3

In this example, a low density (~.92) polyethylene resin (average molecular weight 20,000) was used. A particular resin blend was selected because of an extremely high gel content, vastly exceeding the quality control limits for conventional film forming processes.

(A) The first, second, third and fourth calendar rolls were maintained at a temperature of 122° C., 125° C., 100° C., and 50° C. respectively. The polyethylene was fluxed on a roll mill with 0.2 wt. percent calcium stearate, 0.2 wt. percent stearic acid, and 0.2 wt. percent dibutylparacresol as calendering aids. The fluxed resin composition was fed to the nip between rolls 1 and 2. After passage through the nip the initially formed film followed roll 2 to the nip between rolls 2 and 3. A bank formation was maintained at the ingress side of the nip. After passage through the nip, the fully formed web followed roll 3 to the melt rolling nip between rolls 3 and 4 where no bank formation was permitted. Transition of the web from amorphous to crystalline occurred in the last nip with a linear emergence rate of 125 feet per minute.

(B) For purposes of comparison, the same polyethylene composition was formed into film by a conventional blown tubular extrusion technique. The process consisted of melt extruding the polymer in tubular form and inflating the tubular extrudate with air a short distance from the die orifice while simultaneously linearly stretching the inflated tubing, whereby a slight degree of biaxial orientation was induced. The properties of the two films are provided in Table III below.

TABLE III

|  | 3(A) Melt Rolling | 3(B) Tubular Extrusion |
|---|---|---|
| Tensile Strength, p.s.i.: |  |  |
| Machine Direction | 3,297 | 2,270 |
| Transverse Direction | 2,191 | 1,940 |
| Specular Light Transmission, percent | 31 |  |
| Haze, percent | 7.3 | 24 |
| Gel particles, No./sq. ft | 0 | >500 |

It is seen that in spite of the large content of gel particles (fisheyes) in the resin, the melt rolled film showed no visible defects. This illustrates the advantage of the melt rolling process in the ability to utilize inexpensive, substandard resins.

EXAMPLE 4

(A) Using a high density (~.960) polyethylene having a melt index of 0.90, a film sample was prepared in the manner set forth in Example 3(A), with the exception that the take-off speed of finished film was 50 feet/min. and the temperature of rolls 1, 2, 3 and 4 were 162° C., 168° C., 150° C. and 50° C. respectively.

(B) A comparison sample was prepared from the same high density polymer by the method set forth in Example 3(B). The property differences are shown in Table IV below.

TABLE IV

|  | 4(A) Melt Rolling | 4(B) Tubular Extrusion |
|---|---|---|
| Tensile Strength, p.s.i.: |  |  |
| Machine Direction | 11,901 | 4,080 |
| Transverse Direction | 3,733 | 4,520 |
| Specular Light Transmission, percent | 20 |  |
| Haze, percent | 20 | 71.5 |

EXAMPLE 5

Using a high molecular weight ethylene-oxide-propylene oxide copolymer consisting of about 95 wt. percent ethylene oxide and about 5 wt. percent propylene oxide, having a crystalline melting point of about 55–60° C., and a reduced viscosity value in water of 5.5 (0.1 gm. polymer per 100 ml. solution at 25° C.), two film samples were prepared as follows:

(A) In accordance with the process of this invention, the same procedure as set forth in Example 2(A) was followed having the temperature of rolls 1, 2, 3, and 4 maintained at 161° C., 166° C., 56° C., and 39° C. respectively, and having a take-off speed from the last roll of 60 feet/min.

(B) For purposes of comparison, the same resin was formed into a film according to conventional calendering techniques by maintaining a bank of resin at the nip between rolls 3 and 4, and also between rolls 2 and 3. Temperatures of rolls 1, 2 3 and 4 were maintained at 113° C., 101° C., 96° C. and 95° C. respectively.

Properties of the two films are shown in Table V below.

TABLE V

|  | 5(A) Melt Rolled | 5(B) Conventionally Calendered |
|---|---|---|
| Tensile Strength, p.s.i.: |  |  |
| Machine Direction | 4,330 | 2,238 |
| Transverse Direction | 2,425 | 1,942 |
| Specular Light Transmission, Percent | 33.6 | 1.3 |
| Haze, Percent | 12.9 | 86.9 |
| Gel particle rating (visual) | (1) | (2) |
| Film Thickness, mils | 2.5 | 1.5 |

[1] Excellent.
[2] Poor.

EXAMPLE 6

The procedures of Example 5(A) and 5(B) were repeated using a high molecular weight copolymer of ethylene oxide and styrene oxides. The copolymer consister of about 94 wt. percent of ethylene oxide and about 6 wt. percent styrene oxide, and had a reduced viscosity value of 5.0 in water solution (0.1 gram polymer/100 ml. solution at 25° C.). Crystalline melting point was 52–54° C.

(A) The roll temperatures of the calender operated in accordance with the present process were 163° C., 153° C., 45° C. and 36° C. respectively for rolls 1, 2, 3 and 4. No bank formation was permitted at the last nip and crystallization of the molten web occurred in the last nip. Take-off rate from the last roll was 55 ft./min.

(B) For the conventional calendering method such as used in Example 5(B) the roll temperatuers for rolls 1, 2, 3 and 4 were 109° C., 100° C., 68° C. and 71° C. Bank formation was maintained at the nips between rolls 2 and 3 and between rolls 3 and 4. Comparison of film physical properties is shown in Table VI below.

TABLE VI

|  | 6(A) Melt Rolled | 6(B) Conventionally Calendered |
|---|---|---|
| Tensile Strength, p.s.i.: |  |  |
| Machine Direction | 9,180 | 2,581 |
| Transverse Direction | 2,475 | 2,260 |
| Haze, Percent | 25.4 | 92.9 |
| Gel particle rating (visual) | (1) | (2) |
| Film Thickness, mils | 3.8 | 2.7 |

[1] Excellent.
[2] Poor.

EXAMPLE 7

The procedures of Example 5(A) and 5(B) were repeated using a high molecular weight copolymer of ethylene oxide and butene-1 oxide. The copolymer consisted of about 95 wt. percent ethylene oxide and about 5 wt. percent butene-1 oxide, had a crystalline melting point of 56–58° C., and a reduced viscosity value of 7.5 in water solution (0.1 gram polymer per 100 ml. solution at 25° C.).

(A) The roll temperatures of the calender operated in accordance with the present process were 120° C., 125° C., 51° C. and 29° C. respectively for rolls 1, 2, 3 and 4. No bank formation was permitted at the last nip and crystallization occurred in the last nip at a take-off speed of 62 ft./min. from the last roll.

(B) For the conventional calendering method such as used in Example 5(B) the roll temperature for rolls 1, 2, 3 and 4 were 149° C., 147° C., 104° C. and 109° C. Bank formation was maintained at the nips between rolls 2 and 3 and between 3 and 4. Comparison of film properties is shown in Table VII below.

TABLE VII

|  | 7(A) Melt Rolled | 7(B) Conventionally Calendered |
|---|---|---|
| Tensile Strength, p.s.i.: |  |  |
| Machine Direction | 7,750 | 1,624 |
| Transverse Direction | 2,155 | 1,640 |
| Specular Light Transmission, percent | 30.5 | 1.3 |
| Haze, percent | 13.1 | 94.7 |
| Gel particle rating (visual) | (1) | (2) |
| Film thickness, mils | 3.0 | 2.4 |

1 Excellent.
2 Poor.

EXAMPLE 8

The procedures of Example 5(A) and 5(B) were repeated using a high molecular weight terpolymer of ethylene oxide, stryene oxide, and butylene oxide. The terpolymer consisted of about 94.5 wt. percent ethylene oxide, about 3 wt. percent styrene oxide, and about 2.5 wt. percent butene-1 oxide, had a crystalline melting point of 52–58° C., and had a reduced viscosity value in water solution of 6.0 (0.1 gram polymer/100 ml. solution at 25° C.).

(A) The roll temperatures of the calender operated in accordance with the present process were 172° C., 175° C., 47° C., 41° C. respectively for rolls 1, 2, 3 and 4. No bank formation was permitted at the last nip and crystallization occurred in the last nip at a take-off speed from the last roll of 55 ft./min.

(B) For the conventional calendering method such as used in Example 5(B) the roll temperatures for rolls 1, 2, 3 and 4 were 109° C., 89° C., and 80° C. Bank formation was maintained at the nips between rolls 2 and 3, and between rolls 3 and 4. Comparison of film properties is shown in Table VIII below:

TABLE VIII

|  | 8(A) Melt Rolled | 8(B) Conventionally Calendered |
|---|---|---|
| Tensile Strength, p.s.i.: |  |  |
| Machine Direction | 7,780 | 3,158 |
| Transverse Direction | 2,350 | 2,471 |
| Specular Light Transmission, percent | 29.8 | 0.9 |
| Haze, percent | 17.0 | 90.9 |
| Film thickness, mils | 2.2 | 3.9 |

The films and sheets prepared by the present process are useful because of their high tensile strengths and good optical clarity for overwrapping and general packaging of commercial products. The clear, water soluble films made by this technique from water soluble homopolymers, copolymers and terpolymers of ethylene oxide are particularly useful for unit packaging of pre-measured amounts of chemicals such as soaps, detergents, dry bleaches, water treatment chemicals, fungicides, insecticides, herbicides, pigments and other materials commonly used in aqueous dispersions and solutions.

What is claimed is:

1. Process for the preparation of oriented crystalline thermoplastic film and sheeting which comprises passing a preformed web of a molten, amorphous, crystallizable, organic, thermoplastic polymer into the nip formed by a pair of counter-rotating rolls without the formation of a bank at the ingress side of the nip, maintaining the temperature of at least one of said rolls below the crystalline melting point of said polymer so that the web is optically clear without the formation of a frostline as it enters the roll nip, increasing the roll separating force in said roll nip until a clear, glossy, web having a crystallinity of at least about five percent emerges from the egress side of said roll nip.

2. The process according to claim 1 wherein the temperature of both counter-rotating rolls is below the crystalline melting point of the polymer being processed.

3. The process according to claim 1 wherein at web thicknesses below about 5 mils, the counter-rotating rolls are driven at the same peripheral roll speeds.

4. The process according to claim 1 wherein at web thicknesses greater than about 5 mils, the counter-rotating rolls are driven at speeds in the ratio of from 1.0 to not greater than about 2.0.

5. Process for the preparation of oriented crystalline thermoplastic film and sheeting which comprises passing a preformed web of a molten, amorphous, crystallizable, organic, thermoplastic polymer into the nip formed by a pair of counter-rotating rolls without the formation of a bank at the ingress side of the nip, maintaining the temperature of at least one of said rolls below the melting point of said polymer so that the web is optically clear and free of any frost line as it enters said nip, but sufficiently cool to undergo the phase transition from the amorphous state to the crystalline state as it passes through said nip, increasing the roll separating force in said roll nip until a clear, glossy web having a crystallinity of at least about twenty percent emerges from the egress side of said roll nip.

6. The process according to claim 5 wherein the temperature of both counter-rotating rolls is below the melting point of the polymer being processed.

7. The process according to claim 6 wherein the temperature is from about 10° C. to about 50° C. below the melting point of the polymer being processed.

8. The process according to claim 5 wherein the organic thermoplastic polymer is a polymer of an alkylene oxide.

9. The process according to claim 5 wherein the organic thermoplastic polymer is a fiber-forming ethylene oxide polymer.

10. The process according to claim 5 wherein the organic thermoplastic polymer is a normally solid fiber-forming ethylene polymer.

11. The process according to claim 5 wherein the organic thermoplastic polymer is a normally solid fiber-forming propylene polymer.

12. Process for the preparation of oriented, crystalline thermoplastic film and sheeting which comprises passing a molten, amorphous thermoplastic web into the nip formed by a pair of counter-rotating rolls without the formation of a bank at the ingress side of the nip, maintaining the temperature of at least one of said rolls below the crystalline melting point of said thermoplastic web, adjusting the roll temperatures, roll speeds and the roll separating force such that frostline formation is precluded on either the ingress or egress side of said roll nip thereby inducing crystallization to occur substantially instantaneously in said roll nip, whereby a clear oriented web having a crystallinity of at least about five percent emerges from the egress side of the nip.

References Cited

UNITED STATES PATENTS

| 2,491,525 | 12/1949 | Sparks et al. | 264—40 |
| 2,526,318 | 10/1950 | Battin | 18—10 |
| 2,631,954 | 3/1953 | Bright | 264—175 |
| 3,004,296 | 10/1961 | Snedeker | 264—175 |
| 3,007,207 | 11/1961 | Salhofer | 264—175 |

ROBERT F. WHITE, Primary Examiner.

S. A. HELLER, G. AUVILLE, Assistant Examiners.